(12) United States Patent
Xu et al.

(10) Patent No.: US 9,690,561 B2
(45) Date of Patent: Jun. 27, 2017

(54) PREINSTALLED APPLICATION MANAGEMENT METHOD FOR MOBILE TERMINAL AND MOBILE TERMINAL

(71) Applicant: Huawei Device Co., Ltd., Shenzhen (CN)

(72) Inventors: Haiyan Xu, Beijing (CN); Guoqiao Chen, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 0 days.

(21) Appl. No.: 14/303,907

(22) Filed: Jun. 13, 2014

(65) Prior Publication Data

US 2014/0298320 A1  Oct. 2, 2014

Related U.S. Application Data

(63) Continuation of application No. PCT/CN2012/086435, filed on Dec. 12, 2012.

(30) Foreign Application Priority Data

Dec. 13, 2011  (CN) .......................... 2011 1 0415241

(51) Int. Cl.
*G06F 9/445* (2006.01)
(52) U.S. Cl.
CPC . *G06F 8/62* (2013.01); *G06F 8/61* (2013.01)
(58) Field of Classification Search
None
See application file for complete search history.

(56) References Cited

U.S. PATENT DOCUMENTS 6,078,747 A 6/2000 Jewitt
6,131,192 A * 10/2000 Henry ...................... G06F 8/61
707/999.101

(Continued)

FOREIGN PATENT DOCUMENTS

CN  1577252 A  2/2005
CN  1601467 A  3/2005

(Continued)

OTHER PUBLICATIONS

Johnson et al., Analysis of Android Applications' Permissions, published on 2012 IEEE Sixth International Conference on Software Security and Reliability Companion, Jun. 2012, pp. 45-46.*

(Continued)

*Primary Examiner* — Tuan Q. Dam
*Assistant Examiner* — Zheng Wei
(74) *Attorney, Agent, or Firm* — Conley Rose, P.C.

(57) ABSTRACT

An embodiment of the present invention discloses a preinstalled application management method for a mobile terminal, where storage space of the mobile terminal includes at least one directory, and an installation package of at least one preinstalled application is stored in the at least one directory. The method includes: starting the mobile terminal; scanning the at least one directory; and installing the installation package of the at least one preinstalled application in the at least one directory to generate a preinstalled application having user-level permission. Besides, an embodiment of the present invention further provides a mobile terminal. By using the method and the mobile terminal, the preinstalled application can be uninstalled.

20 Claims, 2 Drawing Sheets

(56) References Cited

U.S. PATENT DOCUMENTS

| | | | |
|---|---|---|---|
| 6,347,397 B1* | 2/2002 | Curtis | G06F 8/61 707/999.202 |
| 6,493,871 B1* | 12/2002 | McGuire | G06F 8/65 717/169 |
| 6,519,762 B1* | 2/2003 | Colligan | G06F 21/80 714/E11.133 |
| 7,136,885 B2 | 11/2006 | Wright et al. | |
| 7,480,655 B2* | 1/2009 | Thomas | G06F 21/52 |
| 7,664,982 B2 | 2/2010 | Mue et al. | |
| 8,032,881 B2* | 10/2011 | Holmberg | G06F 8/65 717/171 |
| 8,635,590 B1 | 1/2014 | Ogilvie | |
| 8,639,973 B2 | 1/2014 | Lee et al. | |
| 8,983,870 B2* | 3/2015 | Krzystofczyk | G06F 8/63 705/51 |
| 9,052,982 B1 | 6/2015 | Ogilvie | |
| 9,176,971 B2 | 11/2015 | Shapiro | |
| 2004/0019888 A1* | 1/2004 | Jain | G06F 8/61 717/176 |
| 2004/0117783 A1 | 6/2004 | Kaminsky et al. | |
| 2004/0122873 A1 | 6/2004 | Wright | |
| 2004/0128664 A1* | 7/2004 | Johnson | G06F 11/1415 717/168 |
| 2004/0205749 A1* | 10/2004 | Dalton | G06F 8/60 717/178 |
| 2005/0091214 A1 | 4/2005 | Probert et al. | |
| 2005/0262502 A1* | 11/2005 | Lari | G06F 8/61 717/175 |
| 2005/0289537 A1* | 12/2005 | Lee | G06F 8/61 717/174 |
| 2006/0004756 A1* | 1/2006 | Peleg | G06F 8/62 |
| 2006/0041572 A1 | 2/2006 | Maruyama | |
| 2006/0048139 A1* | 3/2006 | Nakamura | G06F 8/62 717/174 |
| 2007/0150886 A1* | 6/2007 | Shapiro | G06F 8/61 717/174 |
| 2007/0168528 A1* | 7/2007 | Taniguchi | G06F 9/468 709/229 |
| 2007/0250830 A1* | 10/2007 | Holmberg | G06F 8/65 717/171 |
| 2008/0216066 A1* | 9/2008 | Oh | G06F 8/68 717/173 |
| 2009/0183151 A1 | 7/2009 | Gharabally et al. | |
| 2010/0313196 A1* | 12/2010 | De Atley | G06F 21/51 717/174 |
| 2011/0202911 A1* | 8/2011 | Brooks | G06F 8/68 717/174 |
| 2011/0252119 A1* | 10/2011 | Chiu | H04M 1/72525 709/221 |
| 2011/0307879 A1* | 12/2011 | Ishida | G06F 8/68 717/170 |
| 2012/0047499 A1* | 2/2012 | Krzystofczyk | G06F 8/63 717/174 |
| 2012/0151258 A1 | 6/2012 | Lee et al. | |
| 2012/0246442 A1* | 9/2012 | Dolgunov | G06F 8/67 711/209 |
| 2013/0055267 A1* | 2/2013 | Noro | G06F 9/4893 718/100 |
| 2013/0067451 A1* | 3/2013 | Hussain | G06F 8/61 717/172 |
| 2013/0247028 A1* | 9/2013 | Brooks | G06F 8/68 717/177 |
| 2014/0006551 A1* | 1/2014 | Yao | H04L 67/1095 709/217 |
| 2014/0067879 A1* | 3/2014 | Ahn | G06F 17/30312 707/812 |
| 2014/0082608 A1* | 3/2014 | Hayami | G06F 13/12 717/175 |
| 2014/0115693 A1* | 4/2014 | Schieman | G06F 21/53 726/17 |
| 2014/0149582 A1* | 5/2014 | Chien | H04L 67/34 709/224 |
| 2015/0113522 A1* | 4/2015 | Ross | G06F 8/61 717/174 |

FOREIGN PATENT DOCUMENTS

| | | |
|---|---|---|
| CN | 1617101 A | 5/2005 |
| CN | 1735859 A | 2/2006 |
| CN | 1815445 A | 8/2006 |
| CN | 101384997 A | 3/2009 |
| CN | 1755628 B | 4/2010 |
| CN | 102043655 A | 5/2011 |
| CN | 102141926 A | 8/2011 |
| CN | 102231116 A | 11/2011 |
| CN | 202059467 U | 11/2011 |
| CN | 102375753 A | 3/2012 |
| CN | 102521031 A | 6/2012 |
| EP | 1621997 A1 | 2/2006 |

OTHER PUBLICATIONS

Partial English Translation and Abstract of Chinese Patent Application No. CN1601467A, Part 1, Jul. 24, 2014, 4 pages.

Partial English Translation and Abstract of Chinese Patent Application No. CN 1601467A, Part 2, Sep. 9, 2014, 2 pages.

Foreign Communication From a Counterpart Application, PCT Application No. PCT/CN2012/086435, English Translation of International Search Report dated Mar. 28, 2013, 2 pages.

Foreign Communication From a Counterpart Application, PCT Application No. PCT/CN2012/086435, English Translation of Written Opinion dated Mar. 28, 2013, 10 pages.

Foreign Communication From a Counterpart Application, Chinese Application No. 2011010415241.9, Chinese Search Report dated Apr. 23, 2013, 2 pages.

"Android Application Installation Process and Principles," Sep. 21, 2012, 4 pages.

English Translation of "Android Application Installation Process and Principles," Sep. 21, 2012, 5 pages.

Partial English Translation and Abstract of Chinese Patent Application No. CN17556288, May 24, 2016, 4 pages.

"Does Android keep the .apk files? if so where . . . ," Stack Overflow, Retrieved from Internet; URL:http://stackoverflow.com/questions/2507960/does-android- . . . , [retrieved on May 25, 2016], Mar. 24, 2010, 5 pages.

Dipane, J., "Don't want the bloatware on your EVO 3D? Simply uninstall them, no root required," retrieved from the internet; URL: http://androidcentral.com/don-want-bloatware-your-e . . . [retrieved on May 25, 2016], Jun. 23, 2011, 11 pages.

Raja, H., "Remove Pre-Installed Bloatware Apps From Android Devices with Titanium Backup," Retrieved from the Internet; URL: http://www.addictivetips.com/mobile/remove-pre-installed-bloatware-apps-from-android-devices-with-titanium-backup/ [retrieved on May 24, 2016], Dec. 10, 2010, 4 pages.

Sony, "Recovery and Troubleshooting Guide," VAIO, 2010, 32 pages.

Marden, J., "HTC Evo 3D Bloatware Can be Removed Without Root," Retrieved from the Internet; URL: http://www.androidguys.com/2011/06/23/htc-evo-3d-bloatwa . . . [retrieved on May 25, 2016], Jun. 23, 2011, 1 page.

"Factory Reset—the what, why, and how for Gingerbread," Retrieved from the Internet; URL: https://community.verizonwireless.com/thread/544836, [retrieved on May 25, 2016], Jun. 1, 2011, 5 pages.

Chathz, "Chathz's Mobile Tips—working tips for buying and maintaining your mobile phone," Retrieved from the Internet; URL: https://chathzmobiletips.blogspot.in/2008/12/deleting-pre-installed-java-games-in.html, [retrieved on May 24, 2016], Dec. 10, 2008, 1 page.

(56) References Cited

OTHER PUBLICATIONS

Ganapati, P., et al., "Bloatware Creeps Android Phones," Retrieved from the Internet; URL: http:www.wired.com/2010/07/bloatware-android-phones, [Retrieved on May 25, 2016], Jul. 21, 2010, 8 pages.
"Will factory resetting wipe/clear away pre-installed apps?" Android Enthusiasts Stack Exchange, Retrieved from the Intenet; URL: http://android.stacksxchange.com/questions/34498/will-fa . . . , [Retrieved on May 25, 2016], Dec. 1, 2012, 2 pages.
Foreign Communication From a Counterpart Application, Chinese Application No. 201410608634.5, Chinese Office Action dated Apr. 26, 2016, 7 pages.
Foreign Communication From a Counterpart Application, Chinese Application No. 201410608634.5, Chinese Search Report dated Mar. 11, 2016, 6 pages.
Foreign Communication From a Counterpart Application, Chinese Application No. 201410608634.5, Chinese Search Report dated Apr. 18, 2016, 2 pages.
Partial English Translation and Abstract of Chinese Patent Application No. CN102375753, May 16, 2016, 15 pages.
Kim, H., et al., "Examining Storage Performance on Mobile Devices," Proceedings of the 3rd ACM SOSP Workshop on Networking, Systems, and Applications on Mobile Handhelds, Oct. 23, 2011, 7 pages.
Office Action dated Sep. 27, 2016, 20 pages, U.S. Appl. No. 15/175,344, filed Jun. 7, 2016.

* cited by examiner

PREINSTALLED APPLICATION MANAGEMENT METHOD FOR MOBILE TERMINAL AND MOBILE TERMINAL

CROSS-REFERENCE TO RELATED APPLICATIONS

This application is a continuation of International Application No. PCT/CN2012/086435, filed on Dec. 12, 2012, which claims priority to Chinese Patent Application No. 201110415241.9, filed on Dec. 13, 2011, both of which are incorporated herein by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of electronic communications, and in particular, to a preinstalled application management method for a mobile terminal and a mobile terminal.

BACKGROUND

A mobile terminal, such as a mobile phone, generally has applications preinstalled therein. In an operating system, such as an Android system, a preinstalled application is stored in a system partition of a NAND Flash (generally referred to as a flash memory). When a user starts a mobile phone for the first time, or restores a mobile phone to factory defaults, the preinstalled application is installed by using system-level permission by default, and the user cannot uninstall the preinstalled application as required; besides, a version of a preinstalled application is generally upgraded very soon, and there is a time interval between a manufacturer building a preinstalled application into a mobile terminal and a user obtaining a product. As a result, when using the mobile terminal, the user generally receives a prompt message indicating that the application needs to be upgraded. In this case, once the user updates and upgrades the application, the upgraded application coexists with the preinstalled earlier-version application that cannot be uninstalled, and therefore more space in the NAND Flash is occupied and a waste of a space resource is caused.

SUMMARY

Embodiments of the present invention provide a preinstalled application management method for a mobile terminal and a mobile terminal, which can uninstall a preinstalled application from a mobile terminal as required.

According to one aspect, an embodiment of the present invention provides a preinstalled application management method for a mobile terminal, where storage space of the mobile terminal includes at least one directory, and an installation package of at least one preinstalled application is stored in the at least one directory, and the method includes: starting the mobile terminal; scanning the at least one directory; and installing the installation package of the at least one preinstalled application in the at least one directory to generate a preinstalled application having user-level permission, where the having user-level permission refers to that a user has permission to perform an operation including uninstalling.

According to another aspect, an embodiment of the present invention provides a mobile terminal, and the mobile terminal includes: a storing module configured to store at least one directory, where an installation package of at least one preinstalled application is stored in the directory; a starting module configured to start the mobile terminal; a scanning module configured to scan the at least one directory; and an installing module configured to install the installation package of the at least one preinstalled application in the at least one directory to generate a preinstalled application having user-level permission, where the having user-level permission refers to that a user has permission to perform an operation including uninstalling.

As can be learned from the foregoing technical solutions, in the embodiments of the present invention, storage space of the mobile terminal includes at least one directory, and an installation package of at least one preinstalled application is stored in the at least one directory; after the mobile terminal is started, the at least one directory is scanned, the installation package of the at least one preinstalled application in the at least one directory is installed to generate a preinstalled application having user-level permission. Because the installation package of the preinstalled application is installed by using the user-level permission to generate the installation package with user-level permission, and because the preinstalled application with user-level permission is allowed to be uninstalled by a user, the preinstalled application can be uninstalled as required like a third-party application installed by the user.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention more clearly, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Method Embodiment

Using a mobile terminal that uses an Android operating system as an example, a NAND Flash of the mobile terminal is equivalent to a hard disk of a computer and is used for storing an operating system, an application, and the like.

The following are typical partitions of a NAND Flash of an existing mobile terminal: modem partition including related partitions such as original equipment manufacturer (oeminfo) and advanced mobile subscriber software (amss); boot partition storing a bootloader, and used for booting an image during startup; system partition used for storing an operating system and an application; user data partition (userdata partition) used for storing file data of an application; cache partition used for storing an instruction and cache data that are used by a system and an application; recovery partition used for storing a small system for restoring to factory defaults; and miscellaneous (misc) partition used for storing boot information for recovery.

Generally, a preinstalled application is stored in the system partition, for example, in an application directory (app directory). After installation, a generated application is an application with system-level permission, and a user cannot uninstall or delete the application.

A third-party application installed by a user is an application with user-level permission and can be uninstalled by the user. An installation package of the third-party application installed by the user is generally in a directory in the userdata partition, for example, an app directory. When the application is installed, generated file data is also placed in the userdata partition. When the user uninstalls the installed third-party application, the file data generated by the application installed in the userdata partition is deleted, and the system scans the app directory in the userdata partition and deletes the installation package of the third-party application from the app directory at the same time.

Figure 1:
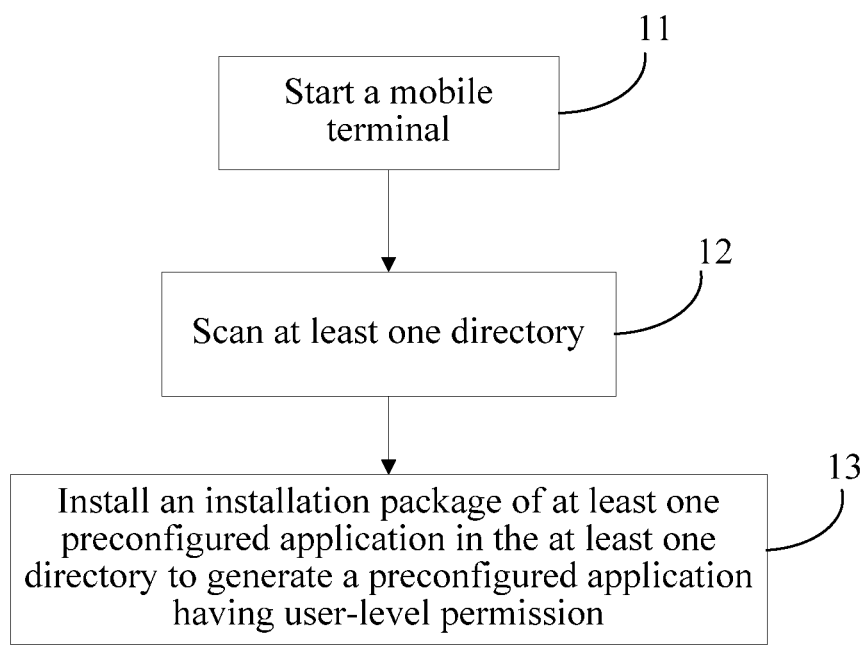
FIG. 1 is a flowchart of a preinstalled application management method for a mobile terminal according to an embodiment of the present invention.

As shown in FIG. 1, an embodiment of the present invention provides a preinstalled application management method for a mobile terminal by using a mobile phone that uses an Android operating system as an example, but it is easy to understand that the present invention is not limited to this.

Storage space of the mobile terminal includes at least one directory, and an installation package of at least one preinstalled application is stored in the at least one directory.

The at least one directory may be added to existing partitions of the mobile terminal. For example, a directory may be added to each of a system partition and a userdata partition of the mobile terminal; for example, each of the directories is customized as a delete application directory (delapp directory), used for storing an installation package of a preinstalled application, that is, an installation package of a preinstalled application is stored in the added system/delapp directory and the userdata/delapp directory.

Preferably, at least one partition may be added based on the existing partitions of the mobile terminal. For example, the at least one partition is named cust partition, used for independently storing custom data, for example, a custom parameter, and can be considered as an extension partition of the system partition. The added at least one directory may be set in the added cust partition, which facilitates management of a system.

For ease of understanding, this embodiment is described by using an example of added directories delapp being in the existing system partition and userdata partition, that is, system/delapp and userdata/delapp, but the present invention is not limited to this.

Referring to FIG. 1, the method includes the following steps:

Step 11: Start the mobile terminal.

After the mobile terminal starts, the mobile terminal starts a Package Manager Service. After the Package Manager Service scans a system application directory, the Package Manager Service adds code and scans the customized directories: the delapp directories; that is, the Package Manager Service scans the system/delapp directory and the userdata/delapp directory.

Step 12: Scan the at least one directory.

Step 13: Install the installation package of the at least one preinstalled application in the at least one directory to generate a preinstalled application having user-level permission.

When the Package Manager Service scans a Package LI, the Package Manager Service installs the installation package in the delapp directory by default, and file data generated by the installed application is placed in the userdata partition. During installation, the Package Manager Service automatically installs the installation package in the delapp directory by using user-level permission, so as to generate the preinstalled application having user-level permission. The user-level permission refers to that a user has permission to perform an operation including uninstalling, and the so-called preinstalled application with user-level permission refers to a preinstalled application that allows a user to uninstall the preinstalled application.

Preferably, during installation, a custom flag, for example, PARSE_IS_REMOVABLE_PREINSTALLED, may be added for distinguishing the preinstalled application having user-level permission from an application installed in system-level permission. In this way, the preinstalled application carrying the flag is equivalent to a third-party application that has user-level permission and is installed by the user, and therefore the preinstalled application can be uninstalled.

Further, in the method provided by this embodiment of the present invention, when the user chooses to restore to factory defaults, an uninstalled preinstalled application is restored to a factory default state of the preinstalled application. Therefore, the method further includes: when the preinstalled application in the mobile terminal is uninstalled, uninstalling the preinstalled application to be uninstalled, and retaining an installation package of the preinstalled application to be uninstalled in the delapp directory. In this way, file data of the uninstalled preinstalled application in the userdata partition is deleted, and the application is uninstalled, but the installation package of the uninstalled preinstalled application still exists in the delapp directory. When the mobile terminal is restored to factory defaults, the preinstalled application can still be installed again by default and restored to a factory default state of the preinstalled application.

Preferably, the installation package of the uninstalled preinstalled application may be retained by using an existing uninstalling mechanism of a mobile terminal. In the existing uninstalling mechanism, when uninstalling a third-party application having user-level permission, the mobile terminal first deletes file data of the application in the userdata partition, and scans an app directory used for storing an installation package of the third-party application in the userdata partition, and then deletes the installation package of the third-party application to be uninstalled that is in the app directory. Because in this embodiment, the preinstalled program is installed by using the user-level permission, which is equivalent to a third-party application installed by a user. Therefore, the method may further include: when an application having user-level permission on the mobile terminal (including the preinstalled application having user-level permission and the third-party application having user-level permission) is uninstalled, scanning the app directory in the userdata partition, determining whether an installation package of the application that has user-level permission and is to be uninstalled exists in the app directory; if the installation package of the application that has user-level permission and is to be uninstalled is not placed in the app directory, which means the application is the preinstalled application having user-level permission, uninstalling, by the mobile terminal, the application that has user-level permission and is to be uninstalled, and retaining the installation package of the uninstalled application having the user-level permission in the delapp directory. In this way, although the third-party application and the preinstalled application are both applications with user-level permission, the installation package of the third-party application installed by the user exists in the userdata/app directory, therefore not only the file data of the application is deleted, but also the installation package of the application is deleted; while the installation package of the preinstalled application is not stored in the userdata/app directory but in the system/delapp directory and userdata/delapp directory, therefore only the file data of the application is deleted, and the installation package of the application is retained in the system/delapp directory and userdata/delapp directory; in this way, when the mobile terminal is restored to factory defaults, the preinstalled application can still be installed again by default and a factory default state of the preinstalled application can be restored.

Preferably, the mobile terminal may be configured so that the preinstalled application displays an uninstall button to implement uninstalling. For example, an init Uninstall Buttons interface and an on Click interface may be modified in Installed App Details, and a delete Package LI interface may be modified in the Package Manager Service.

Further, after the generating at least one preinstalled application having user-level permission in step 13, the method further includes: adding an identifier file, where the identifier file records information for identifying that the preinstalled application is already installed on the mobile terminal. The identifier file may be named booted, and added to a data directory in the userdata partition, that is, userdata/data/booted.

Further, after step 11, the method further includes: determining whether the identifier file exists; and if the identifier file does not exist, this means that the mobile terminal is started for the first time or considered as being started for the first time, performing, by the mobile terminal, the steps of scanning the at least one directory, and installing the installation package of the at least one preinstalled application in the at least one directory to generate a preinstalled application having user-level permission.

If the identifier file exists, this means that the mobile terminal is started at least not for the first time and the preinstalled application is already installed, the mobile terminal normally starts and waits for another operation instruction. In this way, the preinstalled application in the delapp directory is not installed repeatedly, and the uninstalled preinstalled application is not installed again.

It is easy to understand that when the mobile terminal is restored to factory defaults, the booted identifier file is automatically deleted; certainly, the booted identifier file may also be deleted by the user as required.

Further, the preinstalled application may be uninstalled permanently as required. In this case, the added delapp directory cannot be set in the system partition, because data in the system partition cannot be operated; in this way, after the installation package of the preinstalled application in the system/delapp directory is installed, the generated preinstalled application having user-level permission can be uninstalled but cannot be uninstalled permanently. The following describes the permanent uninstalling of the preinstalled application by using the preinstalled application in the userdata/delapp directory as an example. Similar to the foregoing description, the installation package of the preinstalled application is installed by using user-level permission; when the preinstalled application is uninstalled, the file data in the usterdata partition is deleted, and the installation package of the preinstalled application in the userdata/delapp directory is also deleted. Alternatively, the preinstalled application may also be permanently uninstalled by using the existing uninstalling mechanism of the mobile terminal, which specifically includes: when an application having user-level permission (including the preinstalled application having user-level permission and the third-party application having user-level permission) on the mobile terminal is uninstalled, adding code so that the mobile terminal scans the app directory and the delapp directory that are in the userdata partition, determining whether an installation package of the application that has user-level permission and is to be uninstalled exists in one of the app directory and the delapp directory; if yes, deleting the installation package at the same time. In this way, the preinstalled application is considered as a third-party application and is permanently uninstalled. Once being permanently uninstalled, the preinstalled application cannot be restored.

Preferably, when the preinstalled application is uninstalled, options may be set so that the user can choose whether to uninstall (can still be restored to factory defaults) or permanently uninstall the preinstalled application.

In this embodiment of the present invention, the preinstalled application is stored in an added directory, so that, on the basis of not changing existing settings, the system can easily identify that the preinstalled application in the directory should be installed by using user-level permission and the number of preinstalled applications can be conveniently increased or decreased as required, but the present invention is not limited by this as long as the terminal is led to learn the preinstalled application installed by using user-level permission.

In this embodiment of the present invention, storage space of a mobile terminal includes a delapp directory, and after a preinstalled application placed in the directory is decompressed, the preinstalled application is installed by using user-level permission; in this way, the preinstalled application is equivalent to a third-party application installed by a user and is allowed to be uninstalled by the user. Besides, an installation package of the uninstalled preinstalled application is still retained in the delapp; in this way, when the mobile terminal is restored to factory defaults, the uninstalled preinstalled application can be restored to a factory default state. In addition, when the preinstalled application is uninstalled, it may be set that the application installation package in the delapp directory is also deleted; in this way, the preinstalled application can also be permanently deleted.

Device Embodiment

Figure 2:
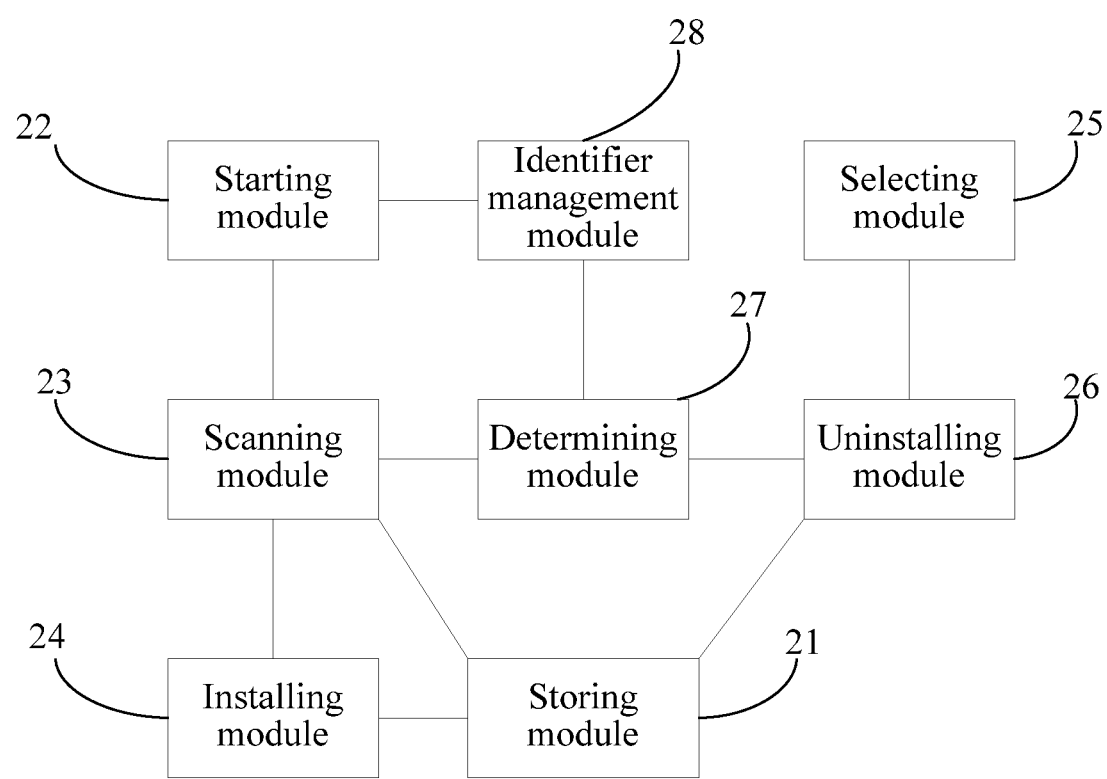
FIG. 2 is a schematic structural diagram of a mobile terminal according to an embodiment of the present invention.

As shown in FIG. 2, an embodiment of the present invention provides a mobile terminal, and the mobile terminal includes the following modules: a storing module 21 configured to store at least one directory, where an installation package of at least one preinstalled application is stored in the directory; a starting module 22 configured to start the mobile terminal; a scanning module 23 configured to scan the at least one directory; and an installing module 24 configured to install the installation package of the at least one preinstalled application in the at least one directory to generate a preinstalled application having user-level permission, where the having user-level permission refers to that a user has permission to perform an operation including an uninstalling operation.

Further, the mobile terminal further includes: a selecting module 25 configured to receive an uninstalling command of a user, determine one or more of the preinstalled applications having user-level permission as a preinstalled application to be uninstalled; and an uninstalling module 26 configured to uninstall the preinstalled application to be uninstalled, and retain an installation package of the preinstalled application to be uninstalled.

Further, the storing module 21 includes a system partition, where the at least one directory is not in the system partition; and the uninstalling module 26 is further configured to uninstall the preinstalled application to be uninstalled and delete the installation package of the preinstalled application to be uninstalled stored in the at least one directory.

Further, the storing module further includes a user data partition, where the user data partition includes another directory, where an installation package of a third-party application having user-level permission is stored in the another directory; and the mobile terminal further includes a determining module 27; the selecting module 25 is further configured to receive an uninstalling command of a user, determine one or more of applications having user-level permission as an application to be uninstalled, where the applications having user-level permission include the preinstalled application having user-level permission and the third-party application having user-level permission; the scanning module 23 is further configured to scan the another directory; the determining module 27 is configured to determine whether an installation package of the application which has user-level permission and is to be uninstalled exists in the another directory; and the uninstalling module 26 is further configured to: when the installation package of the application which has user-level permission and is to be uninstalled is not placed in the another directory, uninstall the application which has user-level permission and is to be uninstalled, and retain the installation package of the application which has user-level permission and is to be uninstalled.

Further, the scanning module 23 is further configured to scan the another directory and the at least one directory; the determining module 27 is further configured to determine whether the installation package of the application which has user-level permission and is to be uninstalled is stored in the another directory or the at least one directory; and the uninstalling module 26 is further configured to: when the determining module determines that the installation package of the application which has user-level permission and is to be uninstalled is stored in the another directory or the at least one directory, uninstall the application which has user-level permission and is to be uninstalled and delete the installation package of the application having user-level permission.

Further, the mobile terminal further includes: an identifier management module 28 configured to add an identifier file after the installing module generates at least one preinstalled application having user-level permission; or configured to delete the identifier file when the mobile terminal is restored to factory defaults; or configured to delete the identifier file when an instruction for deleting the identifier file is received from the user, where the identifier file records information for identifying that the preinstalled application is already installed on the mobile terminal.

The determining module 27 is further configured to: after the mobile terminal is started, determine whether the identifier file exists; when the determining module determines that the identifier file does not exist, the scanning module 23 scans the at least one directory; and the installing module 24 installs the installation package of the at least one preinstalled application in the at least one directory to generate the preinstalled application having user-level permission.

For related working principles and working processes in this embodiment of the present invention, reference may be made to the method embodiment, and details are not repeated herein.

In this embodiment of the present invention, at least one directory is stored in the storing module 21 of the mobile terminal, and an installation package of at least one preinstalled application is installed in the directory. After the starting module 22 starts the mobile terminal, the scanning module 23 scans the at least one directory, and the installing module 24 installs the installation package of the at least one preinstalled application in the at least one directory to generate a preinstalled application having user-level permission; because a preinstalled application with user-level permission is allowed to be uninstalled by a user, in this way, the preinstalled application can be uninstalled as required like a third-party application installed by the user. Besides, when the preinstalled application is uninstalled, the uninstalling module 26 may uninstall the preinstalled application to be uninstalled, and retain an installation package of the preinstalled application to be uninstalled stored in the at least one directory, or delete the installation package at the same time; in this way, the uninstalled preinstalled application can still be restored to a factory default state or be permanently deleted.

It is easy to understand that the directory name involved in this embodiment such as delapp is only exemplary but is not a limitation to the present invention.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

In conclusion, the foregoing embodiments are only exemplary embodiments of the present invention, and are not intended to limit the present invention. Any modification, equivalent replacement, and improvement made without departing from the spirit and principle of the present invention all fall in the protection scope of the embodiments of the present invention.

What is claimed is:

1. A preinstalled application management method for a mobile terminal, wherein storage space of the mobile terminal comprises at least one directory, and an installation package of at least one preinstalled application is stored in the at least one directory, the method comprising:
   starting the mobile terminal;
   scanning the at least one directory;
   installing the installation package of the at least one preinstalled application in the at least one directory to generate at least one preinstalled application having user-level permission, wherein the user-level permission allows a user to have permission to perform an uninstalling operation, and wherein an option is set to allow the user to selectively retain or permanently uninstall the installation package of the at least one preinstalled application in the at least one directory in a case that the mobile terminal is restored to factory defaults;

adding an identifier file associated with the at least one preinstalled application to a user data partition of the mobile terminal; and retaining the identifier file associated with the at least one preinstalled application after the at least one preinstalled application is deleted from the mobile terminal to prevent the at least one preinstalled application from being reinstalled.

2. The method according to claim 1, wherein the method further comprises:

receiving an uninstalling command of the user;

determining one or more of the preinstalled application having user-level permission to be uninstalled;

uninstalling the one or more of the preinstalled application; and retaining an installation package of the one or more of the preinstalled application.

3. The method according to claim 1, wherein the storage space comprises a system partition, and the at least one directory is not in the system partition, and wherein the method further comprises:

receiving an uninstalling command of the user;

determining one or more of the preinstalled application having user-level permission to be uninstalled;

uninstalling the one or more of the preinstalled application; and deleting the installation package of the one or more of the preinstalled application.

4. The method according to claim 1, wherein the storage space further comprises the user data partition, wherein the user data partition comprises another directory, and an installation package of a third-party application having user-level permission is stored in the another directory, and wherein the method further comprises:

receiving an uninstalling command of the user;

determining one or more of application having user-level permission to be uninstalled, wherein the one or more of application having user-level permission comprises the preinstalled application having user-level permission and the third-party application having user-level permission;

scanning the another directory;

determining whether the installation package of the one or more of application exists in the another directory; and uninstalling the one or more of application retaining the installation package of the one or more of application when the installation package of the one or more of application is not placed in the another directory.

5. The method according to claim 1, wherein the storage space comprises a system partition, and the at least one directory is not in the system partition, wherein the storage space further comprises the user data partition, wherein the user data partition further comprises another directory, and an installation package of a third-party application having user-level permission is stored in the another directory, and wherein the method further comprises:

receiving an uninstalling command of the user;

determining one or more of application having user-level permission to be uninstalled, wherein the one or more of application having user-level permission comprises the preinstalled application having user-level permission and the third-party application having user-level permission;

scanning the another directory and the at least one directory;

determining whether the installation package of the one or more of application is stored in the another directory or the at least one directory; and uninstalling the one or more of application and deleting the installation package of the one or more of application having user-level permission when the installation package of the one or more of application is stored in the another directory or the at least one directory.

6. The method according to claim 1, wherein the method further comprises deleting the identifier file when the mobile terminal is restored to factory defaults.

7. The method according to claim 1, wherein the method further comprises deleting the identifier file when an instruction for deleting the identifier file is received from the user.

8. The method according to claim 7, wherein after starting the mobile terminal, the method further comprises:

determining whether the identifier file exists; and performing, by the mobile terminal, steps of scanning the at least one directory, and installing the installation package of the at least one preinstalled application in the at least one directory to generate at least one preinstalled application having user-level permission when the identifier file does not exist.

9. The method according to claim 1, wherein the at least one directory is in at least one existing partition in the storage space of the mobile terminal, or in at least one added partition in the storage space of the mobile terminal.

10. The method according to claim 1, wherein a custom flag is added during installation to distinguish between preinstalled applications having user-level permission and preinstalled applications having system-level permission.

11. The method according to claim 1, wherein the at least one directory comprises the user data directory and an application directory, wherein file data of the at least one preinstalled application is stored in the user data directory, wherein the installation package of the at least one preinstalled application is stored in the application directory, wherein the file data is deleted and the installation package is retained when the user chooses to retain the installation package, and wherein the file data is deleted and the installation package is deleted when the user chooses to permanently uninstall the installation package.

12. A mobile terminal comprising:

an input unit;

a non-transitory storage memory configured to store at least one directory, wherein an installation package of at least one preinstalled application is stored in the directory; and a computer processor coupled with the non-transitory storage memory, wherein the computer processor is configured to:

start the mobile terminal;

scan the at least one directory;

install the installation package of the at least one preinstalled application in the at least one directory to generate at least one preinstalled application having user-level permission, wherein the user-level permission allows a user to have permission to perform an uninstalling operation, and wherein an option is set to allow the user to selectively retain or permanently uninstall the installation package of the at least one preinstalled application in the at least one directory in a case that the mobile terminal is restored to factory defaults;

add an identifier file associated with the at least one preinstalled application to a user data partition of the mobile terminal; and retain the identifier file associated with the at least one preinstalled application after the at east one preinstalled application is deleted from the mobile terminal to prevent the at least one preinstalled application from being reinstalled.

13. The mobile terminal according to claim 12, wherein the computer processor is further configured to:

receive an uninstalling command of the user;

determine one or more of the preinstalled applications having user-level permission to be uninstalled;

uninstall the one or more of the preinstalled application; and retain an installation package of the one or more of the preinstalled application.

14. The mobile terminal according to claim 13, wherein the non-transitory storage memory comprises a system partition, wherein the at least one directory is not in the system partition, and wherein the computer processor is further configured to uninstall the one or more of the preinstalled application, and delete the installation package of the one or more of the preinstalled application.

15. The mobile terminal according to claim 13, wherein the non-transitory storage memory further comprises a user data partition, wherein the user data partition comprises another directory, and an installation package of a third-party application having user-level permission is stored in the another directory, wherein the computer processor is further configured to:

receive an uninstalling command of the user;

determine one or more of application having user-level permission to be uninstalled, wherein the one or more of the application having user-level permission comprise the preinstalled application having user-level permission and the third-party application having user-level permission;

scan the another directory;

determine whether an installation package of the one or more of the application exists in the another directory; and uninstall the one or more of the application and retain theinstallation package of the one or more of the application when determining that the installation package of the one or more of the application is not placed in the another directory.

16. The mobile terminal according to claim 15, wherein the non transitory storage memory comprises a system partition, and the at least one directory is not in the system partition, wherein the computer processor is further configured to:

scan the another directory and the at least one directory;

determine whether the installation package of the one or more of the application is stored in the another directory or the at least one directory; and uninstall the one or more of the application and delete the installation package of the one or more of the application having user-level permission when determining that the installation package of the one or more of the application is stored in the another directory or the at least one directory.

17. The mobile terminal according to claim 12, wherein the computer processor is further configured to:

delete the identifier file when the mobile terminal is restored to factory defaults; or delete the identifier file when an instruction for deleting the identifier file is received from the user, wherein the identifier file records information for identifying that the preinstalled application is already installed on the mobile terminal.

18. The mobile terminal according to claim 17, wherein the computer processor is further configured to:

determine whether the identifier file exists after the mobile terminal starts; and scan the at least one directory and install the installation package of the at least one preinstalled application in the at least one directory to generate the preinstalled application having user-level permission when determining that the identifier file does not exist.

19. The mobile terminal according to claim 12, wherein a custom flag is added during installation to distinguish between preinstalled applications having user-level permission and preinstalled applications having system-level permission.

20. The mobile terminal according to claim 12, wherein the at least one directory comprises the user data directory and an application directory, wherein file data of the at least one preinstalled application is stored in the user data directory, wherein the installation package of the at least one preinstalled application is stored in the application directory, wherein the file data is deleted and the installation package is retained when the user chooses to retain the installation package, and wherein the file data is deleted and the installation package is deleted when the user chooses to permanently uninstall the installation package.

\* \* \* \* \*